Oct. 3, 1950 A. G. STEINMAYER 2,524,404
AERIAL CABLE CUTOUT
Filed March 6, 1947 2 Sheets-Sheet 1
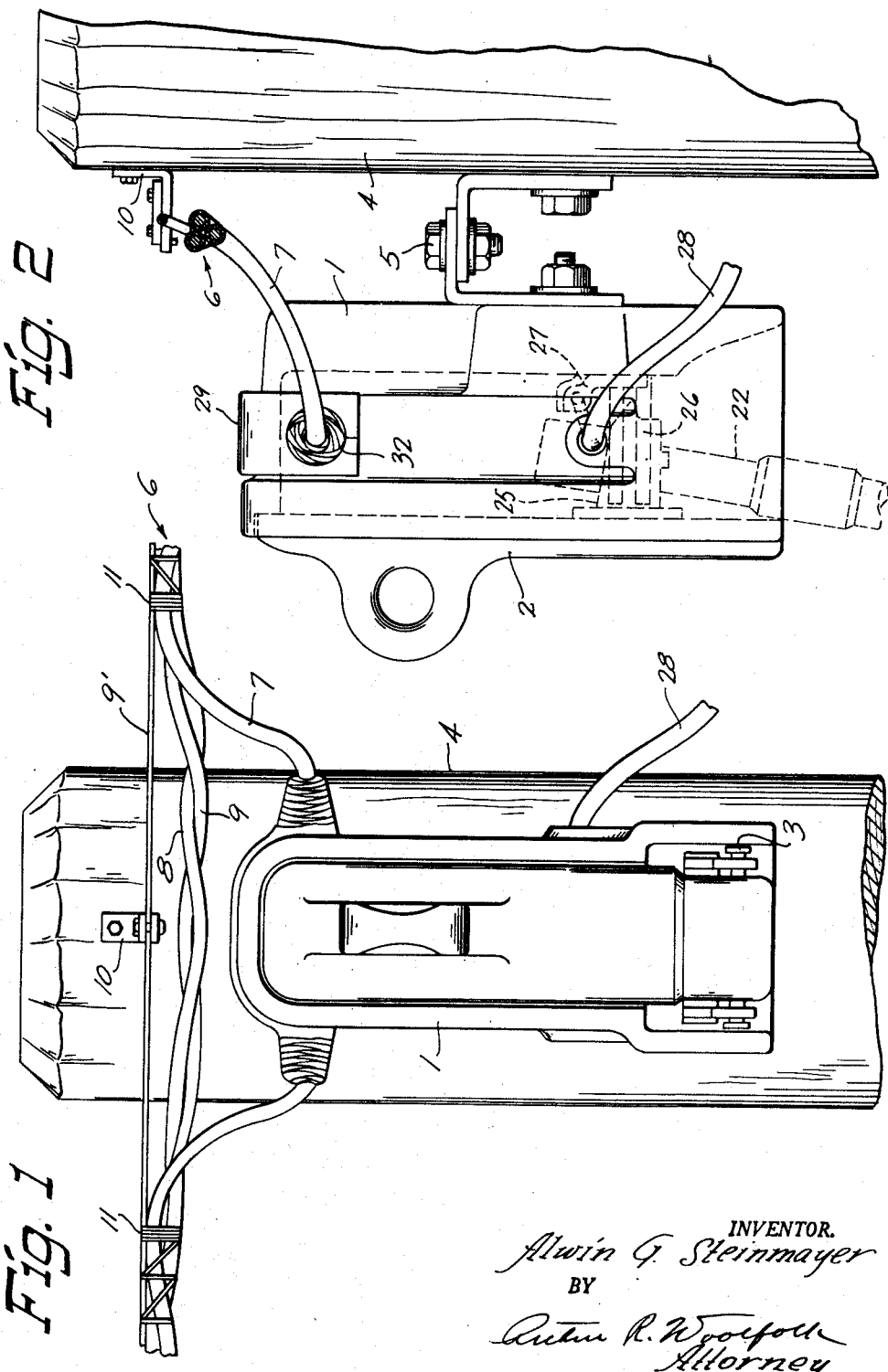
INVENTOR.
Alwin G. Steinmayer
BY
Arthur R. Woolfolk
Attorney Oct. 3, 1950
A. G. STEINMAYER
2,524,404
AERIAL CABLE CUTOUT
Filed March 6, 1947
2 Sheets-Sheet 2
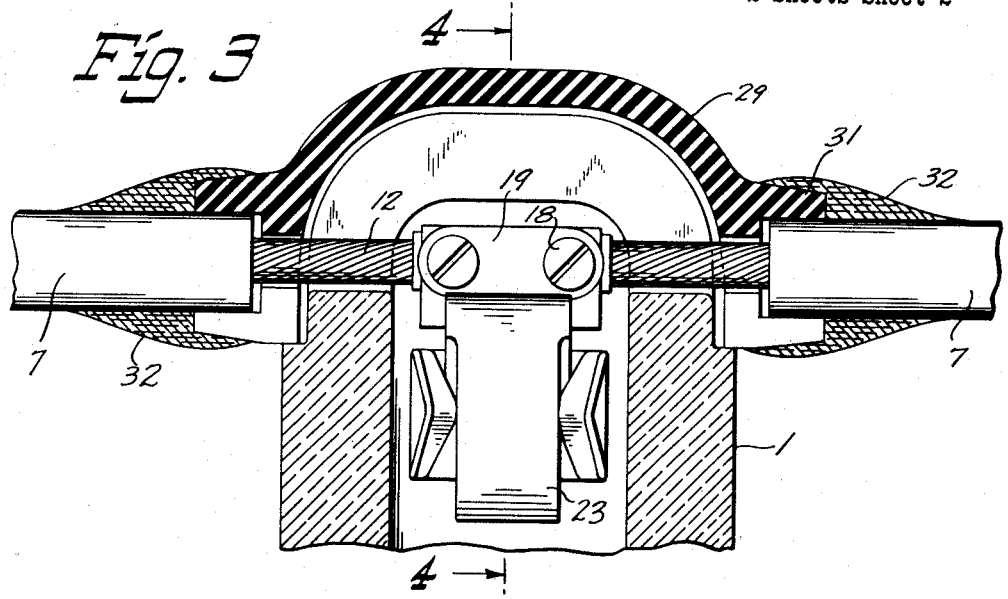
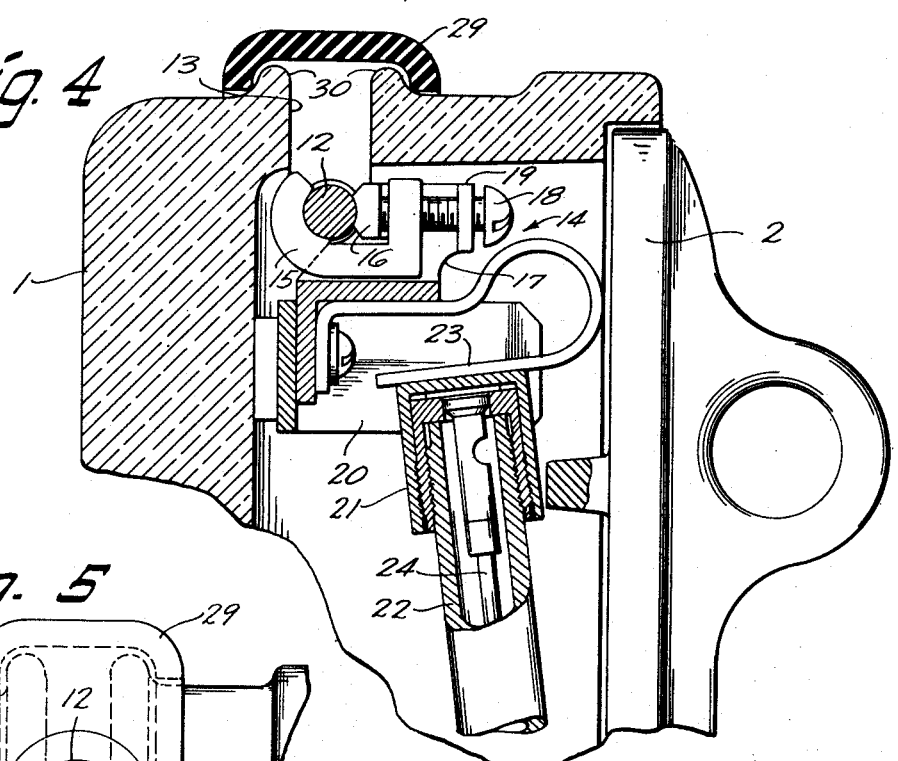
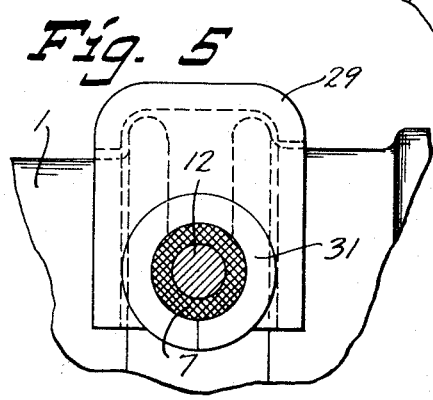
INVENTOR.
Alwin G. Steinmayer
BY
Arthur R. Woolfolk
Attorney Patented Oct. 3, 1950

2,524,404

UNITED STATES PATENT OFFICE 2,524,404

AERIAL CABLE CUTOUT

Alwin G. Steinmayer, Milwaukee, Wis., assignor to McGraw Electric Company, a corporation of Delaware Application March 6, 1947, Serial No. 732,872

5 Claims. (Cl. 174—59)

This invention relates to cutouts and is particularly directed to a cutout construction for an aerial cable.

The present trend in electrical distribution is towards the use of what is called an aerial cable in which one or more cables are bound together by metal tapes or other means and are supported from a messenger wire so that these cables may be passed through trees without danger and also so that they will occupy a smaller amount of room on the supporting poles. In addition to this, there are, of course, many other advantages which do not concern the present invention. However, it is desirable at times to tap a single cable and to install a cutout for that cable. Heretofore it has been necessary to use a considerable amount of additional equipment in order to accomplish the above.

This invention is designed to provide a cutout construction which is particularly suited for use with an aerial cable and which is so made that it is not necessary to cut the cable at all but merely requires the stripping of a small portion of the insulation from the cable and the clamping of the exposed portion of the cable directly to one of the terminals of the cutout structure, the stripped portion being fully housed and protected from the weather.

In greater detail, objects of this invention are to provide a cutout construction for an aerial cable which is so made that it is provided with a transverse slot extending through its upper wall and through the immediately adjacent portions of the side wall, and is arranged to receive the unbroken line conductor or cable, and which is equipped with a flexible cap formed of rubber or other suitable insulating and flexible material which extends across the top of the housing and coacts with upstanding barriers and with the projecting portions of the cable or line conductor on opposite sides of the housing and is provided with split sleeve-like members adapted to be sprung so as to pass over the line conductor and to enclose such line conductor, said sleeve-like portions arranged to be taped to the line conductor and the cap serving to close the slot in the housing, to thus prevent the entrance of water and to prevent birds and insects from entering the housing at this point.

Further objects are to provide a cutout construction for an aerial cable as hereinabove set forth in which a door is provided for the front of the housing, such door giving access not only to the cutout unit itself but also providing access to fastening means for fastening the unbroken line conductor to the upper terminal of the housing.

Further objects are to provide an aerial cable cutout which is of simple construction, which is very easy to install, and which provides access not only to the cutout itself but also to the clamping means for the stripped portion of the cable.

An embodiment of the invention is shown in the accompanying drawings, in which:

Figure 1 is a front view of the cutout and the adjacent portion of the cable showing them attached to a pole.

Figure 2 is a side elevation of the structure shown in Figure 1.

Figure 3 is a vertical sectional view through the upper portion of the cutout.

Figure 4 is a sectional view on the line 4—4 of Figure 3.

Figure 5 is a side view of the upper portion of the housing showing the cable in section with the taping omitted for the sake of clearness.

Referring to the drawings, it will be seen that the cutout comprises a housing 1 of porcelain or other suitable insulating material provided with a door 2 hingedly mounted as indicated at 3 in any suitable manner as, for instance, shown in the United States patent to William O. Schultz, No. Re. 22,372 of September 7, 1943, for a Fuse. The housing is supported from the pole 4 in any suitable manner as by means of a bracket arrangement indicated by the reference character 5 in Figure 2.

In using the apparatus in connection with an aerial cable indicated generally at 6 in Figure 1, it is intended that one of the cables, for example, the cable 7, be unwound from the remaining cables 8 and 9 and looped downwardly as shown in Figure 1. This aerial cable is provided with a supporting messenger wire 9' which may be held by a suitable bracket 10 and thus supported from the pole 4. The aerial cables 7, 8, and 9 are secured to the messenger wire in any suitable manner as by means of the metal tape 11.

The downwardly looped portion of the cable 7 has a small section thereof bared as indicated by the reference character 12 in Figure 3 and this bared portion of the cable is passed downwardly into a slot 13 which extends transversely through the upper portion of the housing 1 of the cutout; that is to say, through the top wall and through the adjacent portions of the side walls. It is unnecessary to cut or break the cable 7 as its unbroken bared portion 12 is merely passed downwardly into the slot 13 of the housing. Thereafter the bared portion of the cable is secured to the upper terminal assembly of the cutout indicated generally at 14 in any suitable manner as by means of C-clamps 15 which clamp the bared portion 12 of the cable to contact members 16 formed integrally with the upper portion 17 of the upper terminal assembly 14. Screws 18 are threaded into the C-clamps and loosely pass through guiding webs 19 formed on the upper member 17. These screws are accessible from the front of the housing when the door is opened and thus constitute fastening means for fastening the cable to the upper terminal assembly. The upper terminal assembly also includes a pair of spring arms 20 which receive between them the upper terminal or cap 21 of the drop-out fuse tube assembly 22, a suitable contact spring 23 also forming a part of the upper terminal assembly 14 and bearing downwardly against the top of the cap 21 of the fuse tube assembly. This fuse tube assembly includes a fuse link 24 and may be of the same construction as that disclosed in the above noted patent to William O. Schultz.

This fuse tube assembly is arranged to be normally retained in place by the fuse link and upon rupture of the fuse link is arranged to drop downwardly or slide downwardly away from the upper terminal assembly 14 as set forth in the above noted patent. It is shown in dotted lines in its dropout position in Figure 2. The fuse tube 22 is slidably carried by a lower terminal member 25 carried by the door 2. This lower terminal member 25 is engaged by spring fingers 26 of the lower stationary terminal 27. This lower stationary terminal is arranged to receive the load conductor 28.

In order to close the upper slot 13 of the housing 1 a flexible insulating cap 29 is provided. This cap may be formed of rubber or other suitable flexible insulating material. It is generally channel-shaped as shown most clearly in Figure 4 and is adapted to coact with upstanding barriers 30 formed on opposite sides of the slot 13, the flexible cap 29 thus serving to close the slot 13. It is provided with split sleeve-like members 31 projecting from opposite sides thereof which are adapted to be sprung over portions of the cable 7 projecting from opposite sides of the housing 1. Thereafter the split sleeve-like conductors or members 31 of the flexible cap are taped as indicated by the reference character 32 to the cable 7. This taping securely locks the split sleeve-like members 31 against opening and also securely locks or fastens the flexible cap to the cable 7. Inasmuch as the cable 7 is attached by the fastening means hereinabove described to the upper terminal assembly, it is clear that the cap also is securely retained against displacement.

It will be seen that a very simple type of cutout construction has been provided which is eminently suited for use with aerial cables or with any other unbroken line conductor. The construction is such that it is necessary merely to bare a small portion of the cable and to position it, as described, in the transverse slot of the housing, the bared portion of the cable being thus protected against weather.

Also it is to be noted that the slot in the housing is adequately closed to prevent the entrance of water, birds or insects at this portion of the housing.

While the device has been illustrated and described as used for a single phase tap on a three phase cable, it is clear that three devices could be employed if three phase service is wished for the branch line. Also it is clear that the device could be used for a single cable as well as a tap on a three phase cable.

Although this invention has been described in considerable detail, it is to be understood that such description is intended as illustrative rather than limiting, as the invention may be variously embodied and is to be interpreted as claimed.

I claim:

1. A housing for a cutout construction arranged to normally electrically connect to an unbroken line conductor comprising an insulating housing having a transverse slot extending through its top portion, an insulating flexible cap arranged to extend across said slot and cover said slot and having split, apertured end portions arranged to receive the unbroken line conductor, the slot in said housing being arranged to receive the unbroken line conductor, and an upper stationary terminal having fastening means for electrically connecting the unbroken line conductor to the upper stationary terminal.

2. A housing for a cutout construction arranged to normally electrically connect to an unbroken line conductor comprising an insulating housing having a transverse slot extending through its upper portion and arranged to receive the unbroken line conductor, said housing having upstanding barriers on opposite sides of said slot, an insulating cap arranged to cover said slot, said cap being channel-shaped and arranged to extend down on opposite sides of said barriers and having side portions arranged to receive the line conductor where it projects from opposite sides of said housing, and an upper stationary terminal having fastening means for electrically connecting the unbroken line conductor to said upper stationary terminal.

3. A housing for a cutout construction arranged to normally electrically connect to an unbroken line conductor comprising an insulating housing having a transverse slot extending through its upper portion and arranged to receive the unbroken line conductor, said housing having upstanding barriers on opposite sides of said slot, an insulating cap arranged to cover said slot, said cap being channel-shaped and arranged to extend down on opposite sides of said barriers and having side portions arranged to receive and interlock with the line conductor where it projects from opposite sides of said housing, and an upper stationary terminal having fastening means for electrically connecting the unbroken line conductor to said upper stationary terminal.

4. A housing for a cutout construction arranged to normally electrically connect to an unbroken line conductor comprising an insulating housing having a transverse slot extending through its upper portion and arranged to receive the unbroken line conductor, said housing having upstanding barriers on opposite sides of said slot, an insulating cap arranged to cover said slot, said cap being channel-shaped and arranged to extend down on opposite sides of said barriers and having flexible, split, sleeve-like side portions arranged to be sprung over and interlock with the line conductor where it projects from opposite sides of said housing, and an upper stationary terminal having fastening means for electrically connecting the unbroken line conductor to said upper stationary terminal.

5. A housing for a cutout construction arranged to normally electrically connect to an unbroken line conductor comprising an insulating housing having a transverse slot extending through its upper portion and arranged to receive the unbroken line conductor, said housing having upstanding barriers on opposite sides of said slot, a flexible, insulating cap arranged to cover said slot and being of channel shape and having portions extending down on opposite sides of said barriers, said cap having split, sleeve-like side portions arranged to receive and interlock with the line conductor where it projects from opposite sides of said housing, means holding said split, sleeve-like portions in interlocking engagement with said line conductor, and an upper stationary terminal having fastening means for electrically connecting said line conductor to the upper stationary terminal.

ALWIN G. STEINMAYER.

REFERENCES CITED

The following references are of record in the file of this patent:

UNITED STATES PATENTS

| Number | Name | Date |
|---|---|---|
| Re. 22,372 | Schultz | Sept. 7, 1943 |
| 761,102 | Randolph | May 31, 1904 |
| 971,785 | Pierce | Oct. 4, 1910 |
| 2,114,745 | McCluskey et al. | Apr. 19, 1938 |
| 2,281,515 | Ruggieri | Apr. 28, 1942 |
| 2,317,088 | Salisbury | Apr. 20, 1943 |